UNITED STATES PATENT OFFICE.

MARTIN LINK, OF FREEPORT, ILLINOIS.

PLASTIC COMPOSITION.

1,244,519.   Specification of Letters Patent.   Patented Oct. 30, 1917.

No Drawing.   Application filed August 5, 1916.   Serial No. 113,330.

*To all whom it may concern:*

Be it known that I, MARTIN LINK, a subject of the Emperor of Germany, and a resident of Freeport, in the county of Stephenson and State of Illinois, have invented certain new and useful Improvements in Plastic Compositions, of which the following is a specification.

This invention relates to improvements in materials used in building constructions and particularly to that class of materials used in a plastic condition for forming the main walls and floors thereof.

The principal object of the invention is to provide a composition consisting of substances relatively low in cost, which are easily obtainable, and which, when in their set or dried condition, have all the advantages possessed by more costly materials, such as cement and the like.

These objects are attained by the preparation and intermingling of ingredients in a specific proportion, and refer particularly to waste material known as cinders, to be obtained in large quantities about gas houses, railroads, etc.

This material, if not already in a finely comminuted condition, is so prepared and mixed with a certain percentage of stucco, comprised of calcined gypsum and powered marble in the form of a dry cement.

My composition consists of the following ingredients combined substantially in the proportions stated:—

| | |
|---|---|
| Ordinary cinders | 85% |
| Stucco cement | 10% |
| Ordinary lime (calcium-oxid) | 05% | the same to be mixed with sufficient water to form a thick paste or plastic compound such as can be readily deposited and formed in molds suitably placed to receive the same.

The molds are preferably constructed of boards secured by proper supports and having between them a space in which the mass is received, the space, when filled, becoming the walls, partitions or floors of the building, so that after the mass has hardened, the boards are removed as no longer required, the faces of the walls being formed by them in any desired finish as smooth, rough or figured.

These walls may afterward be coated with ordinary plaster and finally finished in any desired color as are cement or plaster walls.

These ingredients are mingled by agitation when in a moist condition, and should be poured into the molds before the mass is rigidly set, which it will speedily do if allowed to remain quiet and exposed to the atmosphere.

It may be preferred to add to the mixture, certain binding materials, as straw, hair, or other fibers, although it is not considered necessary in the erection of buildings, as the material will itself set rapidly, forming a firm and solid mass.

I claim:—

The herein described composition of matter consisting of cinders, stucco cement, lime and water, substantially in the proportions specified.

Signed at Freeport, in the county of Stephenson, State of Illinois, this 29th day of April, 1916.

MARTIN LINK.

Copies of this patent may be obtained for five cents each, by addressing the "Commissioner of Patents, Washington, D. C."